United States Patent
Mebberson

(10) Patent No.: US 6,719,222 B2
(45) Date of Patent: Apr. 13, 2004

(54) FLUID DISTRIBUTION DEVICE

(76) Inventor: Nicholas Barson Mebberson, 6 Foam Street, Hampton, Victoria, 3188 (AU)

(*) Notice: Subject to any disclaimer, the term of this patent is extended or adjusted under 35 U.S.C. 154(b) by 0 days.

(21) Appl. No.: 10/205,610

(22) Filed: Jul. 26, 2002

(65) Prior Publication Data
US 2003/0038188 A1 Feb. 27, 2003

Related U.S. Application Data

(63) Continuation of application No. PCT/AU01/00067, filed on Jan. 25, 2001.

(30) Foreign Application Priority Data

Jan. 27, 2000 (AU) ............................................. PQ 5283

(51) Int. Cl.⁷ ........................ A62C 2/08; A62C 37/08; B05B 1/30
(52) U.S. Cl. ...................... 239/548; 239/569; 239/570; 239/583; 137/613
(58) Field of Search ................................ 239/548, 569, 239/570, 583; 137/594, 613

(56) References Cited

U.S. PATENT DOCUMENTS 6,260,583 B1 * 7/2001 Flatt et al. .................. 137/884
6,286,551 B1 * 9/2001 Flatt et al. .................. 137/884

OTHER PUBLICATIONS

Derwent Abstract Accession No. 96–471676/47, JP 08238621 A, (Sintokogio Ltd.), Sep. 17, 1996.

* cited by examiner

Primary Examiner—David D Hwu
(74) Attorney, Agent, or Firm—Lowe Hauptman Gilman & Berner LLP

(57) ABSTRACT

A fluid distribution device (9) includes a distribution block (10) having an array of fluid flow passages (11) arranged in a plurality of at least first and second groups (15, 16). Valve mechanism (12) is operable for controlling fluid flow through the passages (11). The valve mechanism (12) includes a first series of valve members (19) each associated with a respective one of the groups (15) of flow passages (11), and a second series of valve members (20) each associated with a respective one of the second groups (16) of flow passages (11). Each valve member (19, 20) is movable between a closed position preventing flow through the associated flow passages (11) and an open position permitting flow along those passages (11). When all of the valve members (19, 20) associated with any one flow passage (11) are in the open position, fluid is able to flow through that passage.

27 Claims, 6 Drawing Sheets

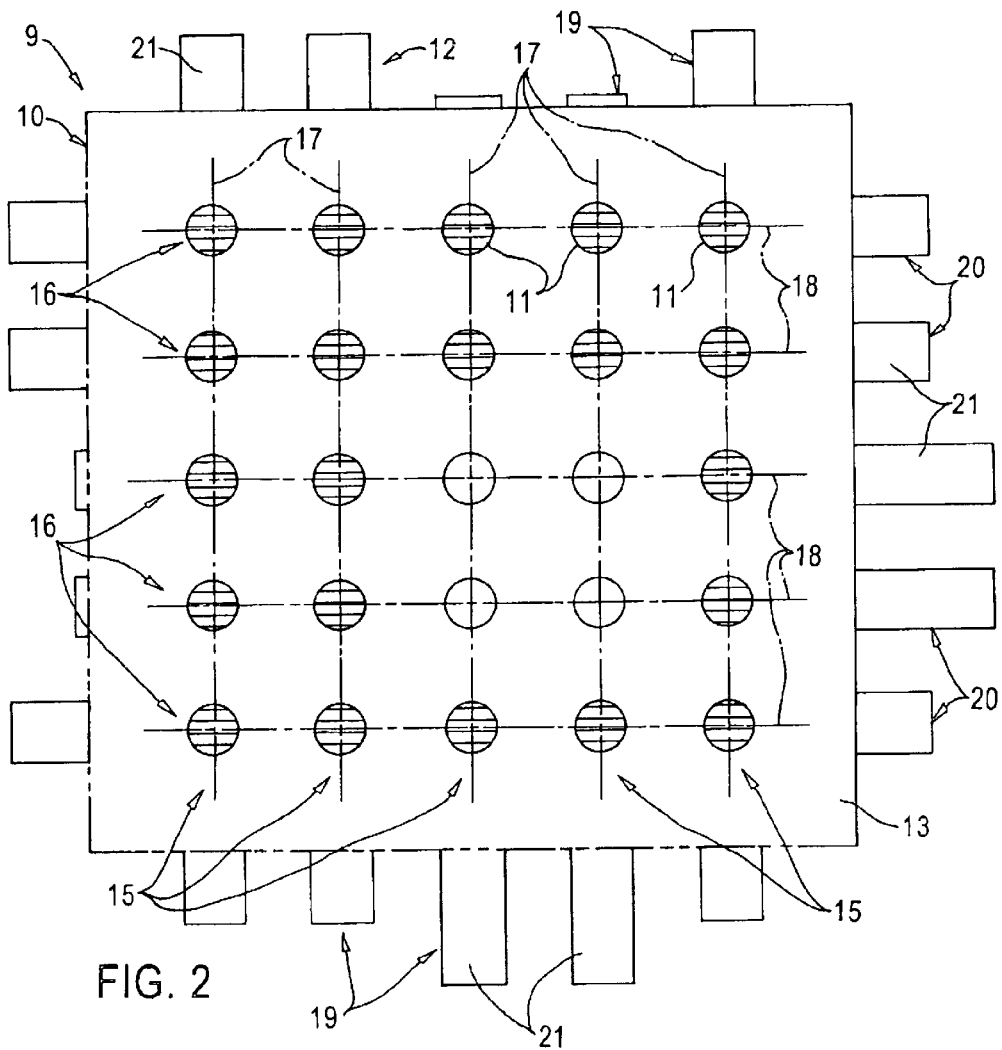
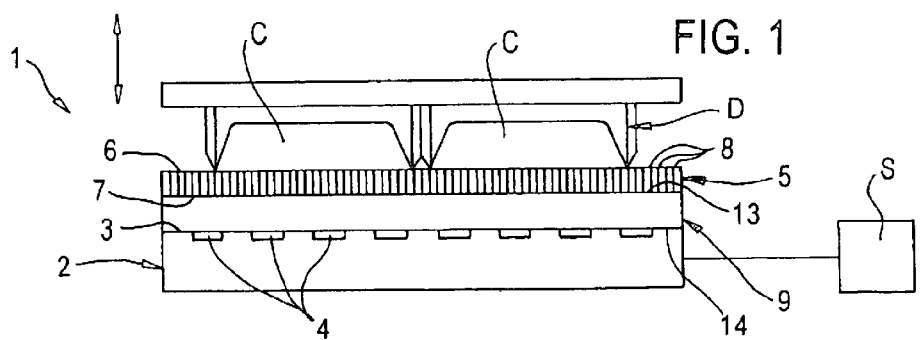
FIG. 2
FIG. 1

FLUID DISTRIBUTION DEVICE

This application is a Continuation of PCT International Application No. PCT/AU01/00067, filed on Jan. 25, 2001.

This invention relates generally to controlled distribution of a pressurised fluid from a fluid source and, in particular, to a device for distributing pressurised gas to selected ones of an array of delivery outlets or ports. The device is applicable for use in pressure thermoforming machinery for supplying forming air to delivery ports communicating with mould cavities during thermoformation of plastic film into thin-walled products. It will be convenient to hereinafter disclose the invention in relation to that exemplary application, although it is to be appreciated that the invention is not limited thereto.

One type of pressure thermoforming machinery includes a die body having one or more mould cavities in which thin plastic film is pressure formed into the shape of the cavities to form thin walled products such as trays and other industrial packaging items. The die body may incorporate trimming knives extending about the mould cavities for cutting the moulded trays from the plastic film. The equipment also includes a heated cutting platen arranged in a facing relationship with openings of the mould cavities in the die body, and the die body and cutting platen are relatively movable toward and away from one another. The plastic film is transported in successive steps along a path between the die body and cutting platen during operating cycles of the machinery.

In each operating cycle, the die body and cutting platen are relatively moved toward one another until a section of film is trapped between the cutting platen and trimming knives so as to create a seal therebetween. Compressed air is injected into the mould cavities forcing the film into direct contact with the cutting platen. The cutting platen is heated so as to heat soften the film section. Pressurised forming air is then introduced through small delivery ports in the cutting platen whereby the heated film is rapidly blown into the mould cavities to adopt the shape thereof.

The now formed portions of the film are cooled and the forming air vented from the cavities. The die body and cutting platen are then again relatively moved toward one another so that the trimming knives cut entirely through the film section to separate the formed products from the film.

The die body and cutting platen are then moved apart, and compressed air is forced between the formed products and the mould cavities to eject the products therefrom. As the products clear the cavities, the film is transported forward along the path carrying the formed and trimmed products clear of the die body and cutting platen, and introducing a sequential section of film to commence a new cycle.

In this type of machinery, the cutting platen has a regular close array, such as rows and ranks, of small delivery ports opening onto its cutting surface. This arrangement enables the cutting platen to be used with die bodies having differently shaped cavities, since at least some of the ports will communicate with the mould cavities when the die body and cutting platen are brought together. Accordingly, it is not necessary to change the cutting platen with each shape of mould cavity.

Various systems have been developed to control distribution of air to selected delivery ports so that only those ports communicating with the cavities are supplied with air. Those distribution systems seek to avoid air streams acting on the film outside the cavities causing uncontrolled shaping of the heated film and leading to distortion of the film and possibly misshaping of the products. Control of the airflow also ensures more efficient use of the air source, thereby reducing the required capacity of the air supply equipment.

One air distribution system provides a supply block having a series of supply channels. The cutting platen is mounted on the supply block, so that each supply channel is in communication with some of the delivery ports, and connected to the air supply through a valve control facility. The supply channels have been arranged in various patterns in an effort to increase the possible combinations of delivery ports to which air can be supplied, and thus improve the overall versatility of the thermoforming machinery. In one pattern, the channels are endless and arranged concentric with one another. In operation, air can be supplied to one or more of the supply channels through the control valve facility, and thus the delivery outlets in communication therewith.

This air distribution system enables more precise delivery of forming air to the delivery ports. However, depending on the shape of the mould cavity openings, air is still delivered to ports which are not in communication with the cavities. To that extent, the above problem with inaccurately delivered air persists. In addition, an extensive control valve facility with associated piping is required to control flow of air to the delivery ports.

A modification of this system involves provision of a distribution foil sheet interposed between the supply block and cutting platen. That sheet has flow holes therethrough arranged so as to communicate between one or more of the supply channels and only those delivery ports which will be in communication with the mould cavities during operation of the machinery. Thus, the holes in the foil sheet can act to supply air quite precisely to individual delivery ports, ensuring that air is confined to the mould cavities. Conveniently, the holes in the sheet will extend over areas which will mirror the "footprint" of the openings of the mould cavities.

Although the use of this foil sheet permits precise delivery of forming air to the cavities, a disadvantage is that the foil sheet is required to be changed with each change in the shape of mould cavity openings. This necessary change over procedure is slow and heavy work because of the need to remove the cutting platen from the machinery in order to access the foil sheet. As a result, there is a significant loss of machinery production time.

An object of the present invention is to provide a fluid distribution device enabling improved fluid delivery to selected delivery ports, such as those of a cutting platen of pressure thermoforming machinery.

Another object of the present invention is to provide an improved apparatus for supplying pressurised forming gas, such as air, to a mould cavity in a die body of pressure thermoforming machinery.

With those objects in mind, the present invention provides in one aspect a fluid distribution device including:
   a distribution block having an array of fluid flow passages, the flow passages being arranged in a plurality of at least first and second groups with each flow passage being included in a respective first group and a respective second group of flow passages; and,
   valve means operable for controlling fluid flow through the passages, the valve means including an at least first series of valve members of which each valve member is associated with a respective one of the first group of flow passages and an at least second series of valve members of which each valve member is associated with a respective one of the second group of flow passages, each valve member being movable between a closed position preventing flow through the associated flow passages and an open position permitting flow along those passages, whereby when all of the valve members associated with any one flow passage are in the open position fluid is able to flow through that passage.

Preferably, the first groups of flow passages comprise lines of flow passages. The second groups of flow passages preferably also comprise lines of flow passages.

In one preferred form, the first groups of flow passages comprise parallel straight lines of flow passages and the second groups of flow passages comprise parallel straight lines of flow passages. The lines of flow passages of the first and second groups can extend at an angle, such as perpendicular, to one another in this form. The flow passages may be arranged in rows and ranks. With this arrangement, each row forms a respective group of flow passages in the plurality of first groups of flow passages and each rank forms a respective group of flow passages in the plurality of second groups of flow passages.

Preferably, each valve member has a separate fluid flow path therethrough for association with a respective flow passage of the respective group of flow passages. The valve member is movable so as to align and misalign all of its flow paths simultaneously with the respective flow passages to respectively permit and prevent fluid flow through the flow paths and along the flow passages. Each valve member preferably has flow apertures therethrough defining the fluid flow paths.

Preferably, each valve member is mounted in a bore in the distribution block for movement in the bore between the open and closed positions. Preferably, each bore extends along a respective row or rank of flow passages and passes through each flow passage of that row or rank. Each valve member is mounted in a respective bore so that in the closed position fluid flow through all of the flow passages of the row or rank along which the bore extends is prevented, and in the open position fluid flow along all of the flow passages is permitted.

In one preferred form, each flow passage has two bores passing therethrough, so that when the two valve members mounted in the respective bores are both in the open position, fluid is able to flow through that passage. The bores passing through each flow passage are spaced from one another in a direction along the flow passage so as to not intersect with one another.

In one preferred form, each valve member includes a valve rod extending along the respective bore. Those rods are mounted for longitudinally sliding movement along the bore between the open and closed positions, in this form. The bores and valve rods are of the same, for example rectangular or circular, cross-sectional shape.

Preferably, sealing elements are provided for fluid sealing between the distribution block and the valve members to seal against leakage of fluid from the flow passages along the bores. Those sealing elements are preferably sealingly mounted in the distribution block. Each sealing element extends about a periphery of a respective flow passage adjacent a respective bore and sealingly engages with the valve member in the bore. Preferably, a pair of sealing elements are associated with each intersection between the bores and flow passages. Each pair of sealing elements extends about the flow passage one on each side of the intersection.

In one preferred form, each sealing element is a sealing O-ring. The distribution block, in this form, includes mounting recesses extending about the flow passages and opening in to the bores for receiving the O-rings therein.

The present invention, in another aspect, provides apparatus for distributing pressurised gas from a gas source to a mould cavity in a die body of pressure thermoforming machinery, including the above fluid distribution device.

Preferably, the apparatus also includes a gas supply block having a gas distribution surface with a series of distribution channels on the surface connectable to a source of pressurised gas for distribution over the surface. The distribution block is mounted on the gas supply block so that the distribution channels are in gas communication with one end of the flow passages.

Preferably, the distribution block has a lower surface onto which each of the flow passages opens. The distribution block is mounted on the gas supply block with the lower surface in sealing face-to-face engagement with the gas distribution surface so that the distribution channels are in gas communication with the ends of the flow passages opening onto the lower surface.

Preferably, the apparatus further includes a cutting platten having a cutting surface for exposure to a mould cavity, and an array of gas delivery ports opening onto the cutting surface for flow of gas through the ports into the mould cavity during use of the apparatus. The cutting platten is mounted on the fluid distribution device so that the flow passages are in gas communication with the delivery ports.

Preferably, the cutting platten has a lower bearing surface from which the delivery ports extend to the cutting surface. The distribution block has an upper surface onto which each of the flow passages opens, and the cutting platten is mounted on the distribution block with the bearing surface in sealing face-to-face engagement with the lower surface so that each flow passage is in gas communication with at least one of the delivery ports.

The following description refers to a preferred embodiment of the fluid distribution device of the present invention. To facilitate an understanding of the invention, reference is made in the description to the accompanying drawings where the device is illustrated in that preferred embodiment. It is to be understood that the device is not limited to the preferred embodiment as hereinafter described and as illustrated in the drawings.

In the drawings:

FIG. 1 is a schematic side view of part of a pressure thermoforming machine incorporating a distributing apparatus including a fluid distribution device according to a preferred embodiment of the present invention;

FIG. 2 is a top plan view of a part of the fluid distribution device of FIG. 1;

Figure 3:
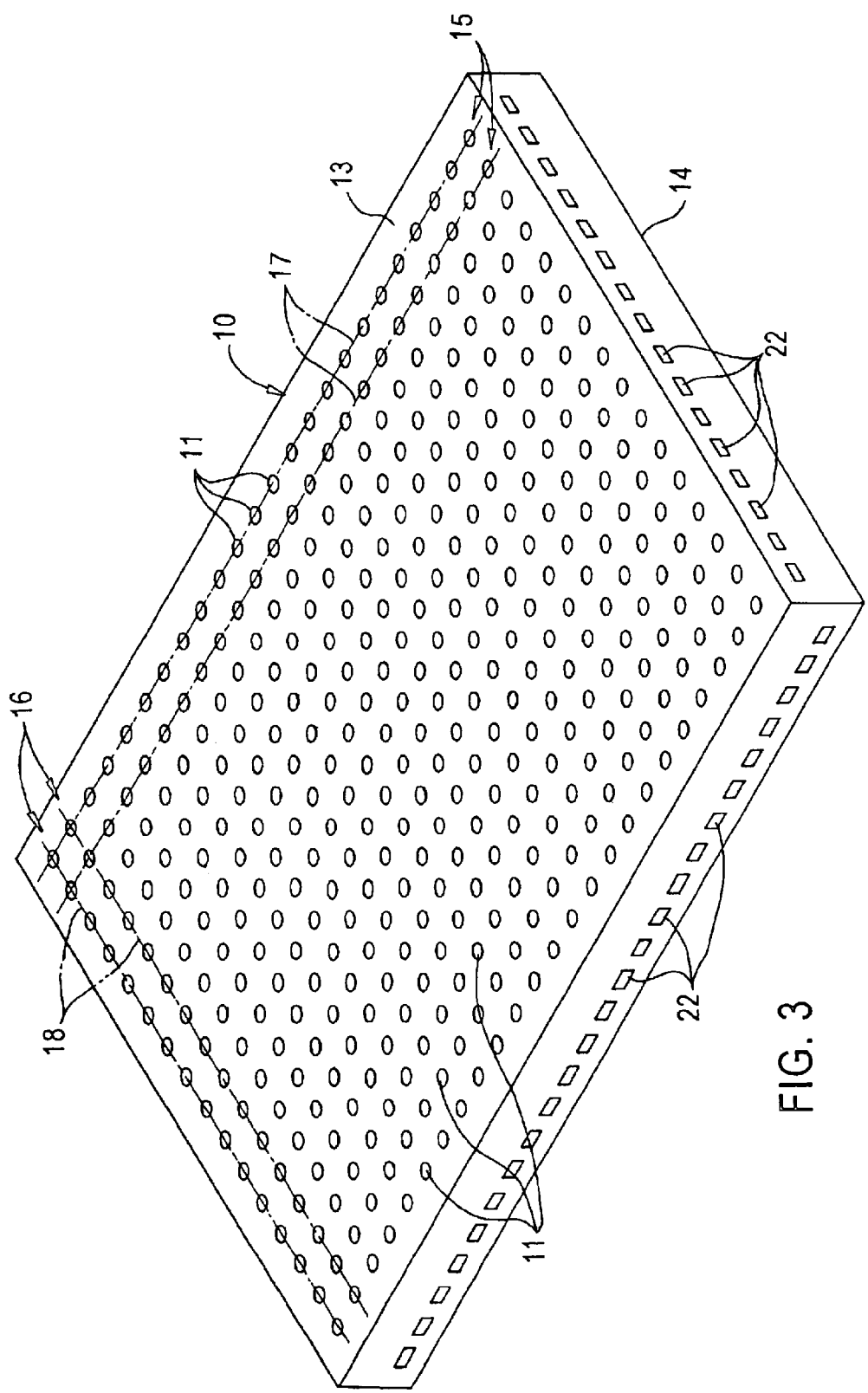
FIG. 3 is a perspective view of a distribution block of the fluid distribution device of FIG. 2.
Figure 4:
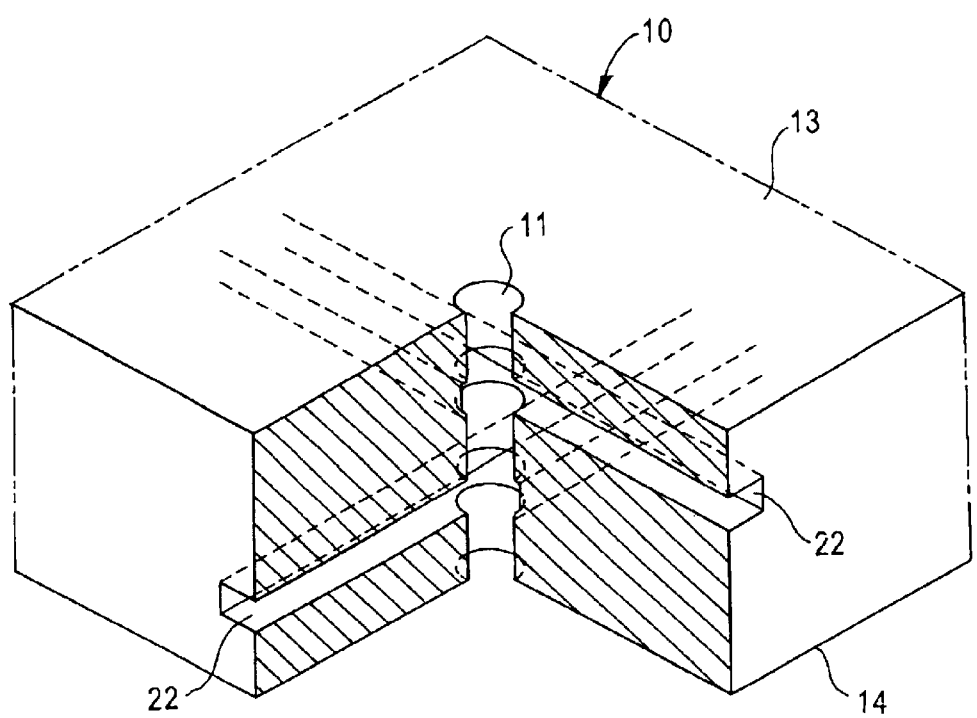
FIG. 4 is a perspective view in section of part of the distribution block of FIG. 3.

Referring initially to FIG. 1 of the drawings there is generally shown an air distribution apparatus 1 for distributing gas, such as air, from a gas source S to mould cavities C in a die body D of pressure thermoforming machinery.

As indicated above, the distribution device of the present invention is particularly suitable for use in such apparatus, and it will be convenient to further described the device in relation to that application. However, those skilled in the relevant art will appreciate that the device will have other applications, and may require some modification in order to accommodate those applications.

The apparatus 1 includes a supply block 2 having a gas distribution surface 3, and a series of supply channels 4 opening onto the surface 3 connected through passageways (not shown) to the gas source S for supply of gas from the supply block 2. The platten 5 has opposed cutting surface 6 and bearing surface 7 and an array of gas delivery ports 8 extending between and opening to selected ports 8 for flow from the cutting surface 6 into the mould cavities C. As will be well appreciated by those skilled in the art, injection of the gas into the mould cavities C from the ports 8 during operation of the machinery will force plastic film lying on the cutting surface 6 to be blow-deformed into the cavities C to adopt the shape thereof.

Distribution of gas from the channels 4 to the delivery ports 8 is achieved through distribution device 9 interposed between the supply block 2 and cutting platten 5. The distribution device 9 is shown in more detail in FIGS. 2 to 7 of the drawings.

The distribution block 9 has upper and lower opposed surfaces 13, 14 between which each of the fluid flow passages 11 extend and open onto. The surfaces 13 and 14 are flat and extend parallel with one another. The cutting platten 5 is mounted on the distribution block 9 with bearing surface 7 of the plate being in face-to-face sealing contact with the upper surface 13 of the distribution block 9. The block 9, in turn, is mounted on the supply block 2 with the lower surface 14 being in face-to-face sealing contact with distribution surface 3 of the supply block 2. With this arrangement, one end of the flow passages 11 is in gas communication with the supply channels 4 whilst the other end of the flow passages 11 will communicate with the delivery ports 8. Thus, in use of apparatus 1, gas can flow from the supply channels 4, through the flow passages 11, to the delivery ports 8, and into the mould cavities C.

In one embodiment, each flow passage 11 is of a shape and size for communication with a single delivery port 8. However, in alternate embodiments, some or all of the flow passages 11 can be shaped and sized for communication with a plurality of delivery ports 8. Thus, in one preferred embodiment, each flow passage 11 communicates with a group of two or three or four adjacent delivery ports 8.

Each flow passage 11 is straight and extends through the distribution block 9 perpendicular to the opposed surfaces 13, 14. Each flow passage 11 is of a circular cross sectional shape.

The flow passages 11 are arranged in a plurality of first groups 15 and second groups 16. Each group 15, 16 comprises a line of flow passages 11, with the lines in each group extending parallel to one another. The lines of flow passages 11 in the first groups 15 extend at an angle to the lines of flow passages 11 in the second groups 16, so that the lines from each group intersect one another. As a result, each flow passage is included in a respective first group and second group of passages 11.

In this embodiment, the lines of flow passages 11 forming each group extend perpendicular to one another. In this way, each line of flow passages 11 in the first groups forms a row 17 and each line of flow passages 11 in the second groups forms a rank 18. With this arrangement, each flow passage 11 is a member of the row 17 and rank 18 that intersect S at that passage 11.

The valve means 12 includes a first series of valve members 19 of which each member 19 is associated with a respective row 17 of flow passages 11, and a second series of valve members 20 of which each member 20 is associated with a respective rank 18 of flow passages 11.

Each valve member 19, 20 includes a valve rod 21 mounted in a bore 22 in the distribution block 9 for movement in the bore 22 between a closed position (shown by valve members $19c$, $20c$ in FIG. 5) preventing gas flow through the associated passages 11 and an open position (shown by valve members $19_o$, $20_o$ in FIG. 6) permitting flow along those passages 11. Each bore 22 extends along the respective row 17 or rank 18 of flow passages 11, and passages through each of the flow passages 11 of that row 17 or rank 18. Thus, each flow passage 11 will have two bores 22 extending therethrough, one that extends along the row 17, containing the passage 11 and one that extends along the rank 18 also containing that passage 11.

The bores 22 extending along the rows 17 are offset from those extending along the ranks 18 so as to not pass through or intersect one another. That is achieved by positioning the bores 22 extending along the rows 17 closer to the upper surface 13 of the distribution block 9, and the bores 22 extending along the ranks 18 closer to the lower surface 14 of the distribution block 9. The bores 22 extend in planes parallel to the surfaces 13, 14.

Each valve rod 21 has separate fluid flow path 23 therethrough for association with each flow passage 11 of the respective row 17 or rank 18. The valve rod 21 is movable so as to align and misalign all of its flow paths 23, simultaneously with the respective flow passages 11. When the flow paths 23 and passages 11 are aligned, the valve rod 21 is in its open position, and fluid can flow along the flow paths 23 through the flow passages 11. Upon movement of a valve rod 21 to misalign the flow paths 23 and passages 11 the valve rod 21 is in its closed position, and the rod 21 acts to block flow through the passages 11.

Figure 5:
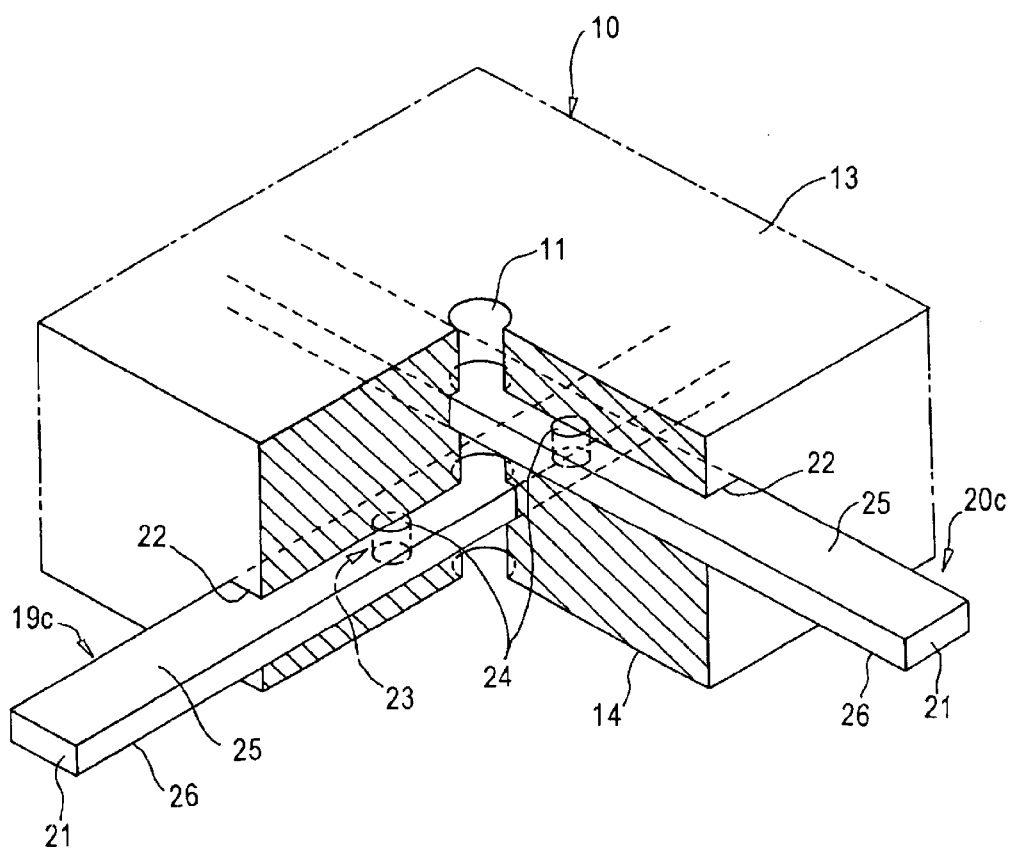
FIG. 5 is a perspective, sectional view similar to FIG. 4 of the distribution device and showing the valve rods associated with a flow passage in a closed position.
Figure 6:
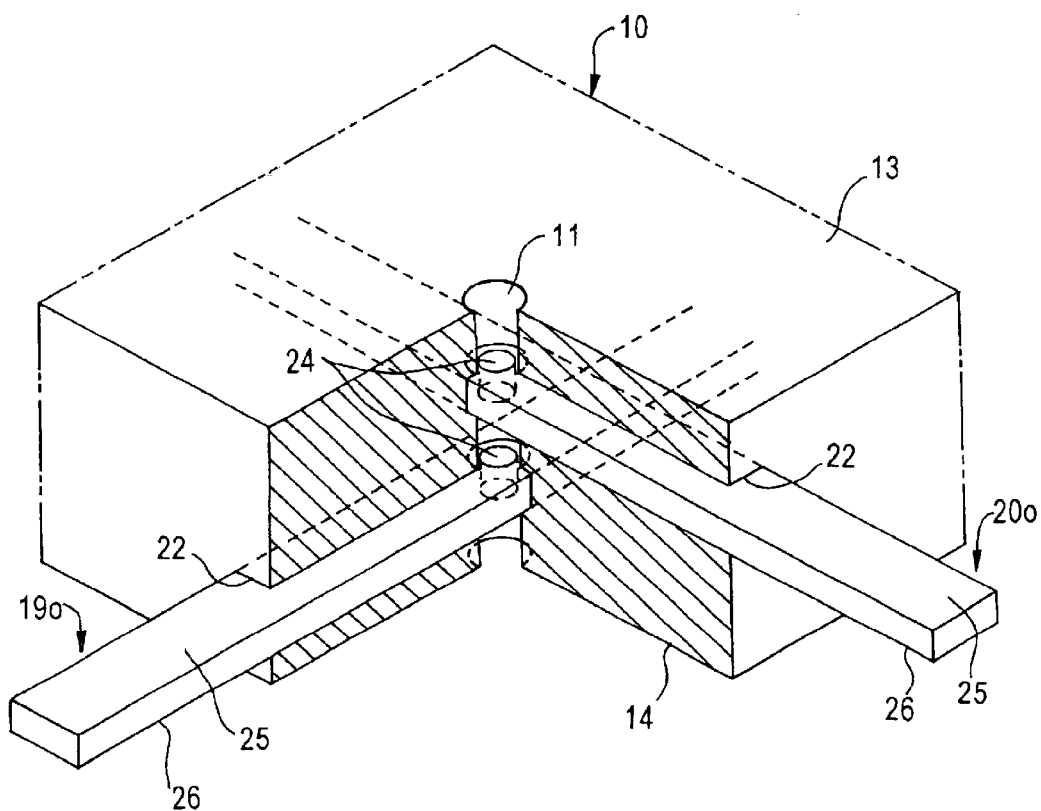
FIG. 6 is a perspective, sectional view similar to FIG. 5 but showing the valve members associated with the flow passage in an open position.
Figure 7:
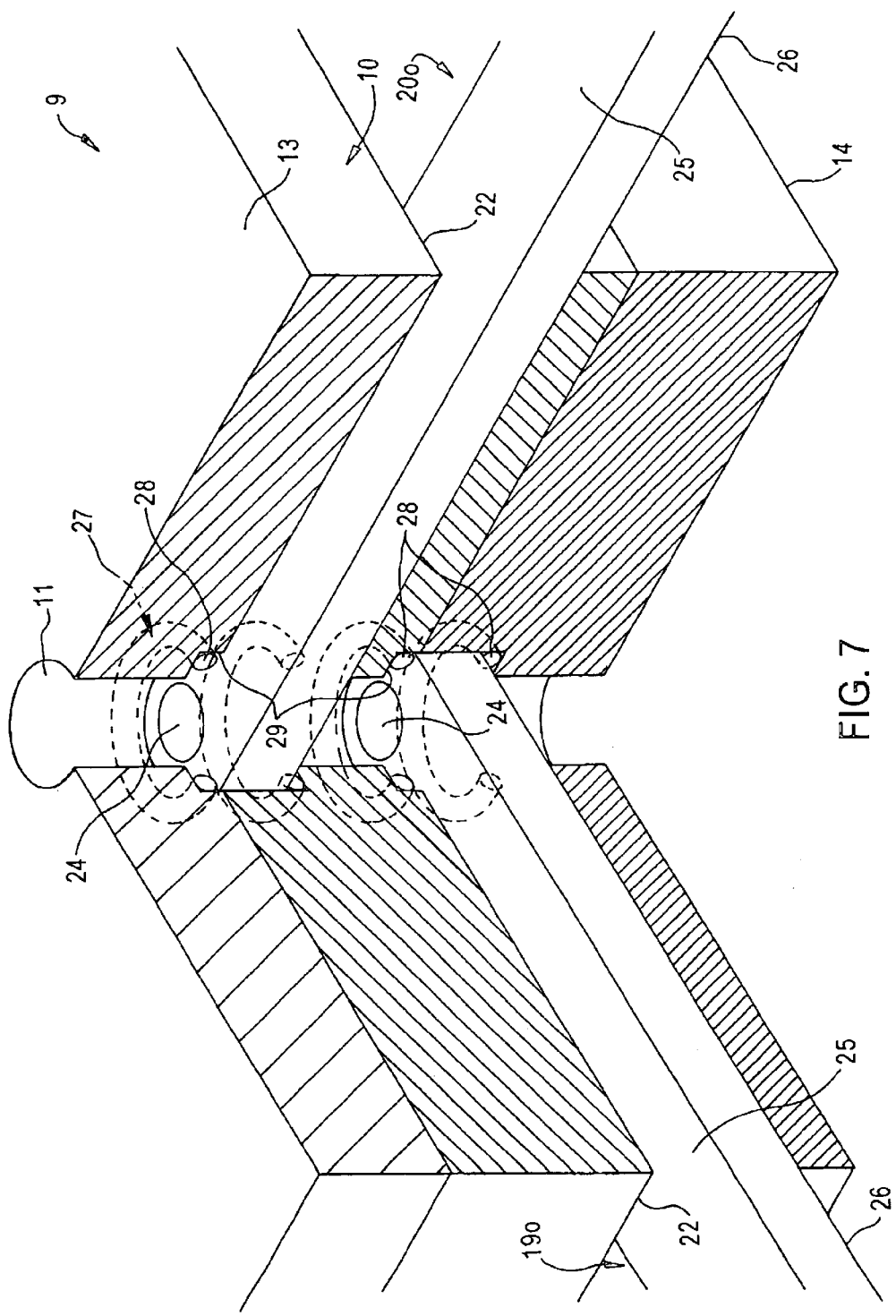
FIG. 7 is an enlarged perspective section view similar to FIG. 6 and showing the sealing rings associated with one flow passage and valve rods.

As shown in FIGS. 5 and 6, the flow paths 23 are provided by apertures 24 extending through the rods 21. In an alternate embodiment (not shown), those flow paths 23 are provided by grooves or other clearways extending about or across the rod 21.

The valve rods 21 and bores 22 are of the same rectangular cross-sectional shape, and relatively sized for neat fitting of the rods 21 in the bores 22. Thus the valve rods 21 each have upper and lower faces 25, 26 between which the apertures 24 extend.

The valve rods 21 are mounted in their bores 22 for linear movement between the open and dosed positions. In this embodiment, the rods 21 are fitted in the bores for longitudinal sliding movement relative thereto. It should be appreciated that in alternative embodiments the valve rods 21 may be mounted for rotational movement about their longitudinal axis, or for combined linear and rotational movement, between the open and closed positions.

The valve rods 21 are fitted so as to seal the bores 22 against flow of fluid from the flow passages 11 into and between the bores 22. That may be achieved by a sufficiently close tolerance fitting of the rods 21 in their bores 22. However, in this embodiment, that sealing is achieved through the provision of sealing elements 27 shown in detail in FIG. 7 of the drawings.

The sealing elements 27 are elastomeric sealing O-rings 28 for sealing between the distribution block 9 and valve rods 21 at the intersections of the flow passages 11 and bores 22. To that end a pair of rings 28 are associated with each intersection between the bores 22 and flow passages 11, with one sealing ring 28 being located on each side of the intersection.

The sealing rings 28 are mounted in the distribution block 9 so as to extend about the cross-sectional periphery of the flow passages 11 adjacent a respective bore 22. The distribution block 9 is provided with mounting recesses 29 that extend about the flow passages 11 and open into the bores 22. The rings 28 are fitted into the recesses 29, so as to seal against the distribution block 9, and protrude sufficiently from the bores 22 to sealingly engage upon a respective face 25, 26 of the rods 21.

The valve rods 21 are individually movable, and that may be achieved by any suitable manner having regard to the intended application of the distribution device 9. In the exemplary application, those rods 21 may be manually movable, or a computer controlled drive mechanism may be installed to move the rods 21 according to programmed instructions.

With the distribution device 9 installed in pressure thermoforming machinery as shown in FIG. 1, each valve rod 21 is moved to an open or closed position so that air is supplied only to those delivery ports 8 which will communicate with the mould cavities C in the die block D. To enable air flow through selected flow passages 11 to the delivery ports 8, the two valve rods 21 associated with those passages 11 must be in their open position. Air is then able to flow from a channel 4 in the supply block 2, along the flow passages 11 through the apertures 24 to the delivery ports 8 in communication therewith.

The distribution device of the present invention enables supply of air to individual and specific delivery ports. Thus, precise and accurate control of forming air into the mould cavities is possible.

In addition, those delivery ports to which air is supplied can be easily varied to accommodate different mould cavity configurations. That can be achieved by in situ adjustment of the valve members without the need to disassemble the thermoforming machinery. As a result, machinery downtime for adjustment purposes is substantially reduced.

The distribution device is relatively simple in both construction and operation.

In its preferred form, the distribution device is suitable for fitting to new and existing thermoforming machinery.

Finally, it is to be understood that various alterations, modifications and/or additions may be made to the distribution device without departing from the ambit of the present invention as defined in the claims appended hereto.

What is claimed is:

1. A fluid distribution device including:
a distribution block having an array of fluid flow passages, the flow passages being arranged in a plurality of at least first and second groups with each flow passage being included in a respective first group and a respective second group of flow passages; and,
valve means operable for controlling fluid flow through the passages, the valve means including an at least first series of valve members of which each valve member is associated with a respective one of the first group of flow passages and an at least second series of valve members of which each valve member is associated with a respective one of the second group of flow passages, each valve member being movable between a closed position preventing flow through the associated flow passages and an open position permitting flow along those passages, whereby when all of the valve members associated with any one flow passage are in the open position fluid is able to flow through that passage.

2. A fluid distribution device as claimed in claim 1, wherein the first groups of flow passages comprise lines of flow passages.

3. A fluid distribution device as claimed in claim 1, wherein the second groups of flow passages comprises lines of flow passages.

4. A fluid distribution device as claimed in claim 1, wherein the first groups of flow passages comprise parallel straight lines of flow passages and the second groups of flow passages comprise parallel straight lines of flow passages, the lines of flow passages of the first and second groups extending at an angle to one another.

5. A fluid distribution device as claimed in claim 4, wherein the flow passages are arranged in rows and ranks, each row forming a respective group of flow passages in the plurality of first groups of flow passages and each rank forming a respective group of flow passages in the plurality of second groups of flow passages.

6. A fluid distribution device as claimed in claim 5, wherein the rows and ranks of flow passages extend perpendicular to one another.

7. A fluid distribution device as claimed in claim 1, wherein the distribution block has a pair of opposed surfaces between which each of the fluid flow passages extends and p pens onto.

8. A fluid distribution device as claimed in claim 1, wherein each valve member has a separate fluid flow path therethrough for association with a respective flow passage of the respective group of flow passages, the valve member being movable so as to align and misalign all of its flow paths simultaneously with the respective flow passages to respectively permit and prevent fluid flow through the flow paths and along the flow passages.

9. A fluid distribution device as claimed in claim 8, wherein each valve member has flow apertures therethrough defining the fluid flow paths.

10. A fluid distribution device as claimed in claim 9, wherein each flow passage is an elongate, straight passage, and the flow apertures align axially with the flow passages to permit fluid flow.

11. A fluid distribution device as claimed in claim 1, wherein each valve member is mounted in a bore in the distribution block for movement in the bore between the open and closed positions.

12. A fluid distribution device as claimed in claim 11, wherein each group of flow passages comprises a line of flow passages, and each bore extends along a respective line of flow passages and passes through each flow passage of that line, each valve member being mounted in a respective bore so that in the dosed position fluid flow through all of the flow passages of the line along which the bore extends is prevented, and in the open position fluid flow along all of the flow passages in that line is permitted, and when all of the valve members mounted in the bores passing through a flow passage are in the open position fluid is able to flow through that passage.

13. A fluid distribution device as claimed in claim 12 wherein each flow passage has two bores passing therethrough, so that when the two valve members mounted in the respective bores are both in the open position, fluid is able to flow through that passage.

14. A fluid distribution device as claimed in claim 13, wherein the bores passing through each flow passage are spaced from one another in a direction along the flow passage so as to not intersect with one another.

15. A fluid distribution device as claimed in claim 11, wherein the valve members are mounted for linear movement along the respective bores between the open and closed positions.

16. A fluid distribution device as claimed in claim 11, wherein each valve member includes a valve rod extending along the respective bore and mounted for longitudinally sliding movement along the bore between the open and closed positions.

17. A fluid distribution device as claimed in claim 16, wherein each bore and valve rod are of rectangular cross-sectional shape.

18. A fluid distribution device as claimed in claim 11, wherein the bores intersect the flow passages, and further including sealing elements for fluid sealing between the distribution block and the valve members to seal against leakage of fluid from the flow passages along the bores.

19. A fluid distribution device as claimed in claim 18, wherein the sealing elements are sealingly mounted in the distribution block, each sealing element extending about a periphery of a respective flow passage adjacent a respective bore and sealingly engaging with the valve member in the bore.

20. A fluid distribution device as claimed in claim 19, wherein a pair of sealing elements are associated with each intersection between the bores and flow passages, the pair of sealing elements extending about the flow passage one on each side of the intersection.

21. A fluid distribution device as claimed in claim 18, wherein each sealing element is a sealing O-ring and the distribution block includes mounting recesses extending about the flow passages and opening in to the bores for receiving the O-rings therein.

22. A fluid distribution device as claimed in claim 11, wherein the valve members protrude from the bores for operation causing movement between the open and closed positions.

23. Apparatus for distributing pressurised gas from a gas source to a mould cavity in a die body of pressure thermoforming machinery, including a fluid distribution device as claimed in claim 1.

24. Apparatus as claimed in claim 23, and further including a gas supply block having a gas distribution surface with a series of distribution channels on the surface connectable to a source of pressurised gas for distribution over the surface, the distribution block being mounted on the gas supply block so that the distribution channels are in gas communication with one end of the flow passages.

25. Apparatus as claimed in claim 24, wherein the distribution block has a lower surface onto which each of the flow passages opens, and the distribution block is mounted on the gas supply block with the lower surface thereof in sealing face-to-face engagement with the gas distribution surface so that the distribution channels are in gas communication with the ends of the flow passages opening onto the lower surface.

26. Apparatus as claimed in claim 23, and further including a cutting platten having a cutting surface for exposure to a mould cavity, and an array of gas delivery ports opening onto the cutting surface for flow of gas through the ports into the mould cavity during use of the apparatus, the cutting platten being mounted on the fluid distribution device so that the flow passages are in gas communication with the delivery ports.

27. Apparatus as claimed in claim 26, wherein the cutting platten has a lower bearing surface from which the delivery ports extend to the cutting surface, and the distribution block has an upper surface onto which each of the flow passages opens, the cutting platten being mounted on the distribution block with the bearing surface in sealing face-to-face engagement with the lower surface so that each flow passage is in gas communication with at least one of the delivery ports.

\* \* \* \* \*